Patented July 31, 1945

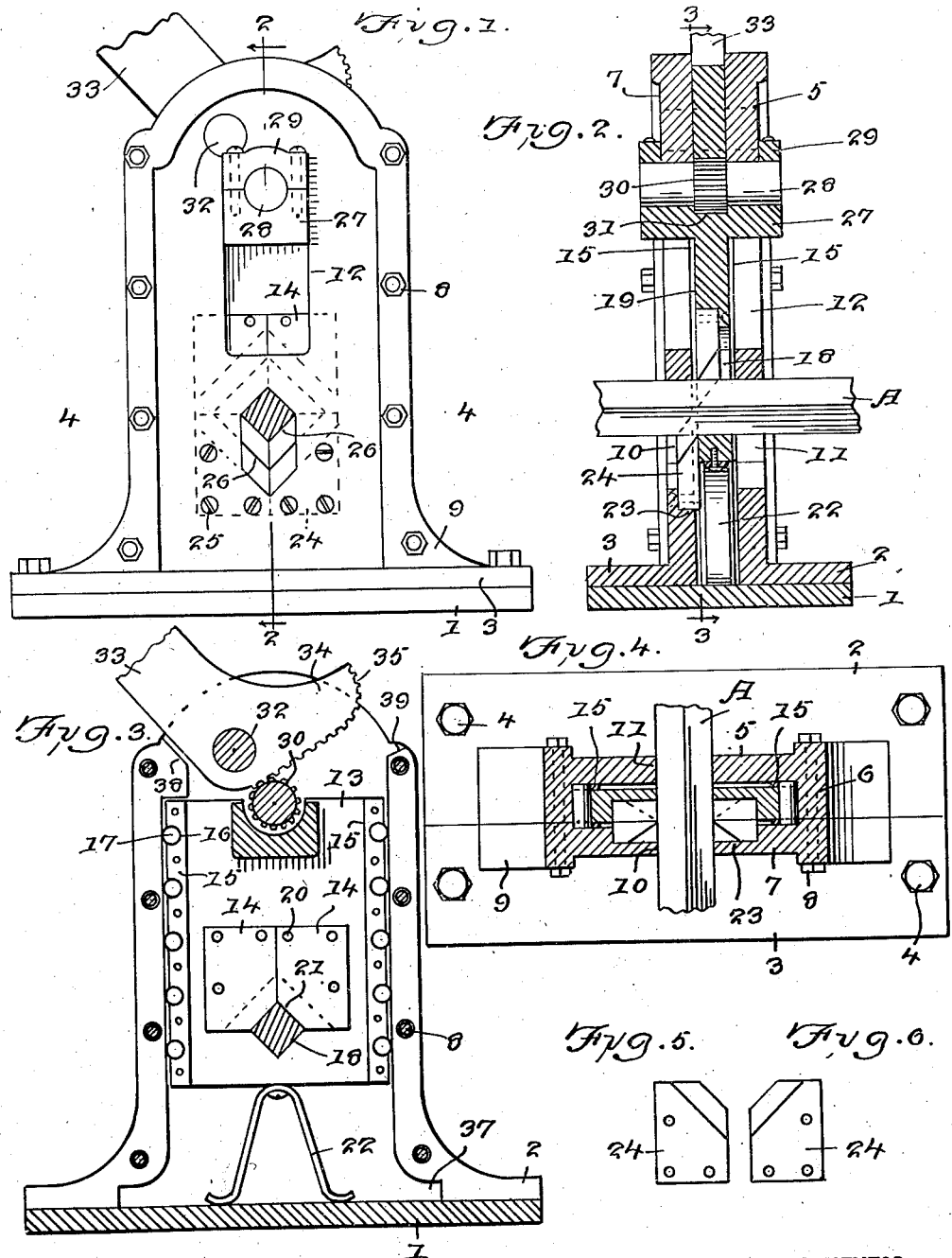

2,380,898

UNITED STATES PATENT OFFICE 2,380,898

CUTTING DEVICE

Rafael Pimentel, Mexico City, Mexico; Martha Pimentel Atristain executrix of said Rafael Pimentel, deceased Application October 22, 1942, Serial No. 462,980

3 Claims. (Cl. 164—47)

This invention relates to cutting devices, and its general object is to provide a device that is primarily designed for cutting rods, bars and the like by a shearing action, and with minimum effort on the part of the user, in that the device includes movable blade means operated by a lever through the medium of a roller bearing mounted carrier for the blade means, the carrier being associated with the lever by a cam like rack and a pinion, and stationary blade means are arranged laterally of the path of the movable blade means for cooperation therewith to bring about the shearing action.

A further object is to provide a rod cutting device that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of my cutting device

Figure 2 is a sectional view taken approximately on line 2—2 of Figure 1, looking in the direction of the arrows.

Figure 3 is a sectional view taken approximately on line 3—3 of Figure 2, looking in the direction of the arrows.

Figure 4 is a sectional view taken approximately on line 4—4 of Figure 1, looking in the direction of the arrows.

Figure 5 is a detail view illustrating one of the stationary blades.

Figure 6 is a similar view illustrating the complementary blade.

Referring to the drawing in detail, the reference numeral 1 indicates a rectangular base plate for the housing structure of my device, and said structure is made up of a pair of sections, namely a body section and a cover section.

The body section includes a base flange 2, and the cover section a base flange 3, the flanges resting upon the base plate and being fixed thereto by bolts 4. The body section also includes a rear wall 5 for the housing and relatively narrow side walls 6, while the cover section includes a wall 7 that provides the front wall of the housing and is fixed to the side walls by bolt and nut connections 8. The walls 5 and 7 extend above the upper ends of the side walls and have upwardly rounded ends. The top of the housing is open and the base plate 1 provides a bottom wall therefor, and the lower ends of the walls 5, 6 and 7 are thickened in outwardly flared formation as at 9 to reinforce their connection with the base flanges.

The front and rear walls are provided with vertically arranged slots 10 and 11 respectively, adjacent to the lower ends thereof, and disposed in registration with each other for the passage of a rod A therethrough to be severed, the rod being of square cross sectional shape in the form shown, as my device is primarily designed for cutting rods and the like of that shape. The upper ends of the slots are of inverted V-shape formation, while the lower ends are of upright V-shape formation so as to fit the rod which is inserted through the slots with a longitudinal edge thereof uppermost, as best shown in Figure 1. Slots 12 are also provided in the front and rear walls, above the first slots, and the slots 12 extend vertically of the walls, as well as in registration with each other, for a purpose which will be later described.

Mounted within the body for vertical sliding movement is a rectangular plate like carrier 13 for a pair of blades 14. Riveted or otherwise secured to the front and rear faces of the carrier along the height of the side edges thereof, are wear strips 15 that may be countersunk in the said faces, but in any event extend outwardly beyond the same to bear against the walls 5 and 7 for spacing the major portion of the carrier therefrom to reduce friction. The strips 15 and the lateral faces of the carrier are provided with horizontally arranged equidistantly spaced seats 16 having mounted therein anti-friction rollers 17 bearing against the side walls 6, to prevent binding of the carrier.

A vertically arranged slot 18 is provided in the carrier adjacent to its lower end for passage of the rod A therethrough, to be carried thereby, and the front face of the carrier is recessed to provide a seat 19 for the blades 14, the blades fitting and being removably secured within their seats by screws 20. The blades 14 are arranged in side edge to edge contact, as well as have their lower inner corners cut away at an inclined angle to provide an inverted V-shaped notch 21 to fit the rod, and from the angle edges, the blades are beveled inwardly. The beveled portions extend into the slot 18, with the outer cutting edges thereof spaced from the V-shaped lower end of the slot 18, a suitable distance to allow free movement of the rod through the slot.

Fixed centrally to the lower end of the carrier is the upper end of a normally arched leaf spring 22 that has its lower ends curved outwardly and engaged with the base plate for normally holding the carrier in its upper position, as best shown in Figure 3, and when in that position, the slot 18 is in registration with the slots 10 and 11 and the cutting edges of the blades 14 are elevated slightly above the upper ends of those slots, so as not to be damaged by the rod, when inserting the latter through the slots.

The inner face of the front wall 7 is recessed to provide a seat 23, for a pair of stationary blades 24 that are removably secured therein in side edge to edge contact by screws 25 and the blades 24 extend above the lower end of the slot 10 as well as have the inner upper corners thereof cut away at an inclined angle, as best shown in Figures 5 and 6 to provide a V-shaped notch 26 to fit the rod and from the angle edges, the blades 24 being beveled outwardly, to provide cutting edges that are arranged slightly below the slot 18 when the carrier is in normal position, so as to prevent the rod from damaging the cutting edges.

Formed on the side faces of the carrier centrally of and at its upper end and extending laterally therefrom for disposal into the slots 12 of the front and rear walls, for guiding the carrier in its movement are bearing blocks 27 having recesses in the upper faces thereof within which is mounted a shaft 28 that is removably held for rotation, by recessed cap blocks 29 secured to the bearing blocks by screw bolts, as best shown in Figure 1. The shaft 28 is circumferentially formed with teeth 30 midway its ends to provide a pinion that extends into a concavity 31 centrally of the upper end of the carrier.

Bridging the front and rear walls adjacent to the upper ends thereof and arranged laterally of and above the shaft 28 is a shaft 32 that is rotatably mounted in said walls, and has the lower end of a hand lever 33 fixed thereto, the lower end being formed to provide an elongated head 34 extending at right angles to the lever and terminating at its outer end into a curved portion providing a cam 35. The lower edge of the head is straight, and the straight edge as well as the cam is formed with teeth 36 along the length thereof, to provide a rack. The teeth 30 of the pinion are held in constant mesh with the teeth 36, by the leaf spring 22, as will be apparent from Figure 3, which also illustrates that the lower ends of the side walls are recessed as at 37 to receive the lower ends of the leaf spring, when the carrier is in its lowermost position.

The upper end of one side wall 6 is inclined to provide an abutment 38 for the hand lever, to hold the same in its normal position, as will be apparent from Figure 3, and the upper end of the other side wall is inclined to provide an abutment 39 to receive and limit the movement of the hand lever to its fully operative position.

From the above description and disclosure in the drawing, it is believed that the operation of my cutter will be obvious, but it might be mentioned that when it is desired to cut a rod, such as for example the rod A, the latter is passed through the slots 10, 18 and 11, thence the hand lever is swung from its normal position, as shown, and such movement results in lowering the carrier and the rod, to sever the latter by a shearing action, due to the arrangement of the beveled cutting edges of the blades relative to each other, as best shown in Figure 2.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a rod cutting device, a body having a vertical guideway opening through the top, said body having registering slots in its upper and lower portions, a flat rectangular plate mounted for vertical sliding movement in the guideway and having a slot registerable with the slots in the lower part of the body, the said body and plate having co-acting rod cutters fixed thereon for cutting a rod extended through the slots, laterally projecting elements formed on the plate and projecting through the upper slots of the body, a plurality of rollers rotatably mounted in the side edges of the plate and engaging the interior of the body, a spring disposed in the bottom of the guideway for resiliently forcing the plate to elevated position, and means operative to slide the plate through downward cutting movement.

2. In a rod cutting device, a body having a vertical guideway opening through the top, said body having registering slots in its upper and lower portions, a flat rectangular plate mounted for vertical sliding movement in the guideway and having a slot registerable with the slots in the lower part of the body, the said body and plate having co-acting rod cutters fixed thereon for cutting a rod extended through the slots, laterally projecting elements formed on the plate and projecting through the upper slots of the body, a plurality of rollers rotatably mounted in the side edges of the plate and engaging the interior of the body, a spring disposed in the bottom of the guideway for resiliently forcing the plate to elevated position, a shaft journaled transversely on the upper part of the plate and the projecting elements thereof, a spur pinion formed on the medial portion of the shaft, a pivot extended transversely through the upper part of the body, a hand lever having its inner portion engaging the said pivot and having an angularly extending foot portion providing a toothed cam edge having a straight part merging into an arcuate part, the said toothed cam portion of the lever being disposed to mesh with the pinion for slidably depressing the plate through its cutting movement upon swinging action of the lever.

3. A rod cutting device comprising a relatively narrow upright housing provided with vertically arranged registering slots, a spring pressed slotted plate like carrier fitting and slidably mounted in the housing and normally held with its slot in registration with the first slots for passage of a rod through said slots, anti-friction rollers mounted in the carrier and bearing against said housing, wear strips for the carrier and bearing against the housing for spacing the carrier therefrom, blades fixed to said carrier, blades fixed within the housing for cooperation with the first blades for severing said rod, said housing being provided with vertically arranged slots above the first slots, bearings secured to and extending laterally of the upper ends of the carrier and mounted for sliding movement in the upper slots, a shaft journaled in the bearings, a pinion formed on the shaft, a second shaft journaled in the housing laterally of and above the first shaft, and a hand lever including an elongated toothed head having a cam portion and providing a rack meshing with the pinion, whereby upon movement of said lever in one direction, the carrier is lowered against the action of its spring for disposing the blades thereof in cooperation with the first blades.

RAFAEL PIMENTEL.